United States Patent
Roblek et al.

(10) Patent No.: US 10,147,197 B2
(45) Date of Patent: Dec. 4, 2018

(54) SEGMENT CONTENT DISPLAYED ON A COMPUTING DEVICE INTO REGIONS BASED ON PIXELS OF A SCREENSHOT IMAGE THAT CAPTURES THE CONTENT

(71) Applicant: Google LLC, Mountain View, CA (US)

(72) Inventors: Dominik Roblek, Meilen (CH); David Petrou, Brooklyn, NY (US); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/839,797

(22) Filed: Dec. 12, 2017

(65) Prior Publication Data

US 2018/0114326 A1 Apr. 26, 2018

Related U.S. Application Data

(63) Continuation of application No. 15/154,957, filed on May 14, 2016, now Pat. No. 9,870,623.

(51) Int. Cl.
*G06T 7/30* (2017.01)
*G06F 17/30* (2006.01)
(Continued)

(52) U.S. Cl.
CPC ............. *G06T 7/30* (2017.01); *G06F 3/0488* (2013.01); *G06F 3/04842* (2013.01);
(Continued)

(58) Field of Classification Search
CPC .... G06F 3/0481; G06F 3/0482; G06F 3/0488; G06F 3/04842; G06F 3/04845;
(Continued)

(56) References Cited

U.S. PATENT DOCUMENTS

2006/0285762 A1 12/2006 Sun et al.
2011/0035406 A1 2/2011 Petrou et al.
(Continued)

FOREIGN PATENT DOCUMENTS

CN 102460515 A 5/2012
CN 102521849 A 6/2012
(Continued)

OTHER PUBLICATIONS

European Patent Office; International Preliminary Report on Patentability of International Application No. PCT/US2016/066941 dated Apr. 16, 2018.
(Continued)

*Primary Examiner* — Jingge Wu
(74) *Attorney, Agent, or Firm* — Middleton Reutlinger

(57) ABSTRACT

Methods and apparatus directed to segmenting content displayed on a computing device into regions. The segmenting of content displayed on the computing device into regions is accomplished via analysis of pixels of a "screenshot image" that captures at least a portion of (e.g., all of) the displayed content. Individual pixels of the screenshot image may be analyzed to determine one or more regions of the screenshot image and to optionally assign a corresponding semantic type to each of the regions. Some implementations are further directed to generating, based on one or more of the regions, interactive content to provide for presentation to the user via the computing device.

18 Claims, 12 Drawing Sheets

(51) Int. Cl.
  *G06T 7/90*       (2017.01)
  *G06F 3/0484*     (2013.01)
  *G06F 3/0488*     (2013.01)
(52) U.S. Cl.
  CPC .. *G06F 17/30047* (2013.01); *G06F 17/30867* (2013.01); *G06T 7/90* (2017.01)
(58) Field of Classification Search
  CPC ....... G06F 3/04847; G06T 2207/20092; G06T 3/4076; G06T 7/30; G06T 7/90
  See application file for complete search history.

(56) References Cited

U.S. PATENT DOCUMENTS

| 2014/0172892 | A1 | 6/2014 | Schechter et al. |
| 2016/0055246 | A1 | 2/2016 | Marcin et al. |

FOREIGN PATENT DOCUMENTS

| CN | 102880381 | A | 1/2013 |
| EP | 2312462 | A1 | 12/2008 |

OTHER PUBLICATIONS

International Search Report and Written Opinion of PCT Ser. No. PCT/US16/66941 dated Mar. 14, 2017.
The Intellectual Property Office of the United Kingdom; Combined Search Report under Section 17 (5)(b) and Abbreviated Examination Report under Section 18(3) of Application No. GB1621800.0 dated Jun. 14, 2017.
State Intellectual Property Office of the People's Republic of China; Office Action issued in Application No. 201611223828.9 dated Jul. 12, 2018; 11 pages.

SEGMENT CONTENT DISPLAYED ON A COMPUTING DEVICE INTO REGIONS BASED ON PIXELS OF A SCREENSHOT IMAGE THAT CAPTURES THE CONTENT

BACKGROUND

Automated extraction of an image and/or other content from certain documents viewed on computing devices by users may be a relatively straight-forward process. For example, an HTML webpage that includes an image may explicitly define a location for that image and that location may be used by a computing device to extract that image. For instance, an image on an HTML webpage may be extracted by one or more computing devices (e.g., by the computing device of the user viewing the HTML webpage) using the hierarchical structure defined by the HTML webpage. The extracted image may be saved to the computing device, communicated to one or more additional computing devices (e.g., via email), etc.

However, there are many situations in which extracting an image and/or other content being viewed on a computing device by a user is more difficult and/or not possible utilizing existing techniques. For example, many applications (e.g., "apps" for mobile phones, tablets, etc.) may generate images and/or other content for display to the user. However, automated extraction of the content from many applications may not be possible unless the application specifically supports exportation of that content. Additional and/or alternative drawbacks of these and/or other approaches may be presented.

SUMMARY

Implementations of this specification are directed to segmenting content displayed on a computing device into regions. Some of those implementations are further directed to generating, based on one or more of the regions, interactive content to provide for presentation to the user via the computing device. The interactive content presented to the user via the computing device may be configured, in response to selection of the interactive content via a user interface input device of the computing device, to cause the computing device to perform one or more actions that are tailored to one or more of the regions utilized to generate the interactive content.

The segmenting of content displayed on the computing device into regions is accomplished via analysis of pixels of a "screenshot image" that captures at least a portion of (e.g., all of) the displayed content. Individual pixels of the screenshot image may be analyzed to determine one or more regions of the screenshot image and to assign a corresponding semantic type to each of the regions. A region defines a continuous area of the screenshot image and a semantic type of a region is a classification of content that is included in that region. Semantic types may include, for example, "image", "text region", "list items"—and/or more granular types such as "photographic image", "image that is a painting". Analysis of pixels from screenshot images may enable extraction of images and/or other content from displays being generated by any one of a plurality of applications, such as displays generated by mobile phone "apps" that don't incorporate functionality for the extraction of images and/or other content. In some implementations, the segmenting of displayed content captured in a screenshot image is achieved based on analysis of only a plurality of the pixels of the screenshot image. In some implementations, the segmenting of displayed content captured in a screenshot image is achieved without analysis of any markup language (e.g., HTML) that may be utilized to generate the display of the content.

In some implementations, a method is provided that is performed by one or more processors and that includes: capturing a screenshot image that captures at least a portion of a display that is provided to a user by a computing device of the user; segmenting the screenshot image into at least a first region and a second region based on a plurality of pixels of the screenshot image; assigning a first semantic type to the first region based on a plurality of the pixels of the first region; generating interactive content based on the first region and the first semantic type of the first region; and providing the interactive content for presentation to the user via the computing device of the user. User selection of the interactive content via a user interface input device of the computing device of the user causes the computing device of the user to perform one or more actions that are tailored to the first region.

These and other implementations of technology disclosed herein may optionally include one or more of the following features.

In some implementations, the interactive content includes a graphical element that, when selected via the user interface input device, causes the computing device to: access a webpage related to visible content of the first region, issue a search related to visible content of the first region, or access a state, of an application, that is related to the visible content of the first region.

In some implementations, the method further includes: identifying particular user interface input provided by the user via the user interface input device or another user interface input device of the computing device; and providing the interactive content for presentation to the user is in response to identifying the particular user interface input. In some of those implementations, the particular user interface input is directed to a portion of the display that corresponds to a subset of the first region and providing the interactive content for presentation to the user is based on the particular user interface input being directed to the portion of the display that corresponds to the subset of the first region. In some versions of those implementations, the interactive content includes a graphical element that, when selected via the user interface input device, causes the computing device to save, on one or more non-transitory computer readable media, a plurality of the pixels of the first region without saving any of the pixels of the second region. In some other versions of those implementations, the interactive content additionally and/or alternatively includes a graphical element that, when selected via the user interface input device, causes the computing device to generate an electronic communication that includes a plurality of the pixels of the first region and that does not include any of the pixels of the second region. Generating the interactive content may be based on the first region and the first semantic type of the first region, and may be independent of the second region. In some of those implementations, providing the interactive content for presentation to the user via the computing device of the user includes providing the interactive content, without providing any interactive content that is determined based on the second region.

In some implementations, the one or more processors that implement the method include one or more computing device processors of the computing device and one or more remote processors that are remote from the computing device. In some of those implementations, the one or more processors capturing the screenshot image consist of one or more of the computing device processors and the one or more processors generating the interactive content comprise one or more of the remote processors. In some of those implementations, the one or more processors segmenting the screenshot image into at least the first region and the second region consist of one or more of the computing device processors. In some versions of those implementations, the method further includes transmitting, by one or more of the computing device processors to a first group of the remote processors, a plurality of the pixels of the first region without transmitting any of the pixels of the second region to the first group of the remote processors. The one or more processors assigning the first semantic type to the first region may consist of one or more of the computing device processors in some of those versions. Moreover, in some of those versions the method may further include: transmitting, by one or more of the computing device processors to the first group of the remote processors, the first semantic type of the first region; and/or selecting, by one or more of the computing device processors, the first group of the remote processors based on the first semantic type of the first region.

In some implementations, the method further includes determining an additional characteristic of the first region in the screenshot image and generating the interactive content further based on the additional characteristic. In some of those implementations, generating the interactive content is dependent on the additional characteristic satisfying a threshold. The additional characteristic may indicate one of: an absolute size of the first region in the screenshot image, a relative size of the first region in the screenshot image, a position of the first region in the screenshot image, and a density of the pixels of the first region in the screenshot image.

In some implementations, segmenting the screenshot image into at least a first region and a second region includes partitioning the screenshot image into a plurality of cells that each contains a unique group of the pixels of the screenshot image and, for each of a plurality of the cells: determining a corresponding one of a plurality of classifications for the cell based on a subset of pixels of the unique group of the pixels contained by the cell and determining the first region based on the determined classifications for the cells. In some of those implementations, determining the first region includes: determining the first region based on one or more minimum bounding boxes that each encompass a plurality of the cells having a first classification of the classifications. In some of those implementations, determining the classification for a given cell of the plurality of cells includes: determining the subset of pixels contained by the cells based on a quasi-random selection process; and determining the classification based on a count of the subset of pixels that are a particular color.

In some implementations, a method is provided that is performed by one or more processors and that includes: capturing a screenshot image that captures at least a portion of a display provided to a user by the computing device; segmenting the screenshot image into at least a first region and a second region based on a plurality of pixels of the screenshot image; determining at least one first characteristic of the first region based on one or more of: a plurality of pixels of the first region, a size of the first region, and a position of the first region; determining at least one second characteristic of the second region based on one or more of: a plurality of pixels of the second region, a size of the second region, and a position of the second region; and performing a particular action based on a plurality of the pixels of the first region. The particular first action is performed on the pixels of the first region based on the first region having the first characteristic and the particular action is not performed on the second region based on the second region having the second characteristic.

These and other implementations of technology disclosed herein may optionally include one or more of the following features.

In some implementations, the first characteristic is a first semantic label and the second characteristic is a second semantic label.

In some implementations, the first action is providing the pixels of the first region to a content recognition engine. In some of those implementations: one or more of the pixels of the second region are provided to a separate content recognition engine based on the second region having the second characteristic; the pixels of the second region are not provided to any content recognition engine based on the second region having the second characteristic; or the pixels of the second region are not provided for any further action based on the second region having the second characteristic.

In some implementations, a method is provided that is performed by one or more processors and that includes: capturing a screenshot image that captures at least a portion of a display provided to a user by a computing device of the user; segmenting the screenshot image into at least a first region and a second region based on a plurality of pixels of the screenshot image; assigning a first semantic type to the first region based on a plurality of the pixels of the first region; determining content based on the first region and the first semantic type of the first region; and providing the content for presentation to the user via the computing device of the user.

These and other implementations of technology disclosed herein may optionally include one or more of the following features.

In some implementations, the content is an informational graphical element including a property of an entity present in the first region, an image of the entity, and/or other content focused on the entity.

In some implementations, the content is interactive content.

In some implementations, the content is static content. In some of those implementations, the content is an informational graphical element including a property of an entity present in the first region, an image of the entity, and/or other content focused on the entity.

In addition, some implementations include one or more processors of one or more computing devices, where the one or more processors are operable to execute instructions stored in associated memory, and where the instructions are configured to cause performance of any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
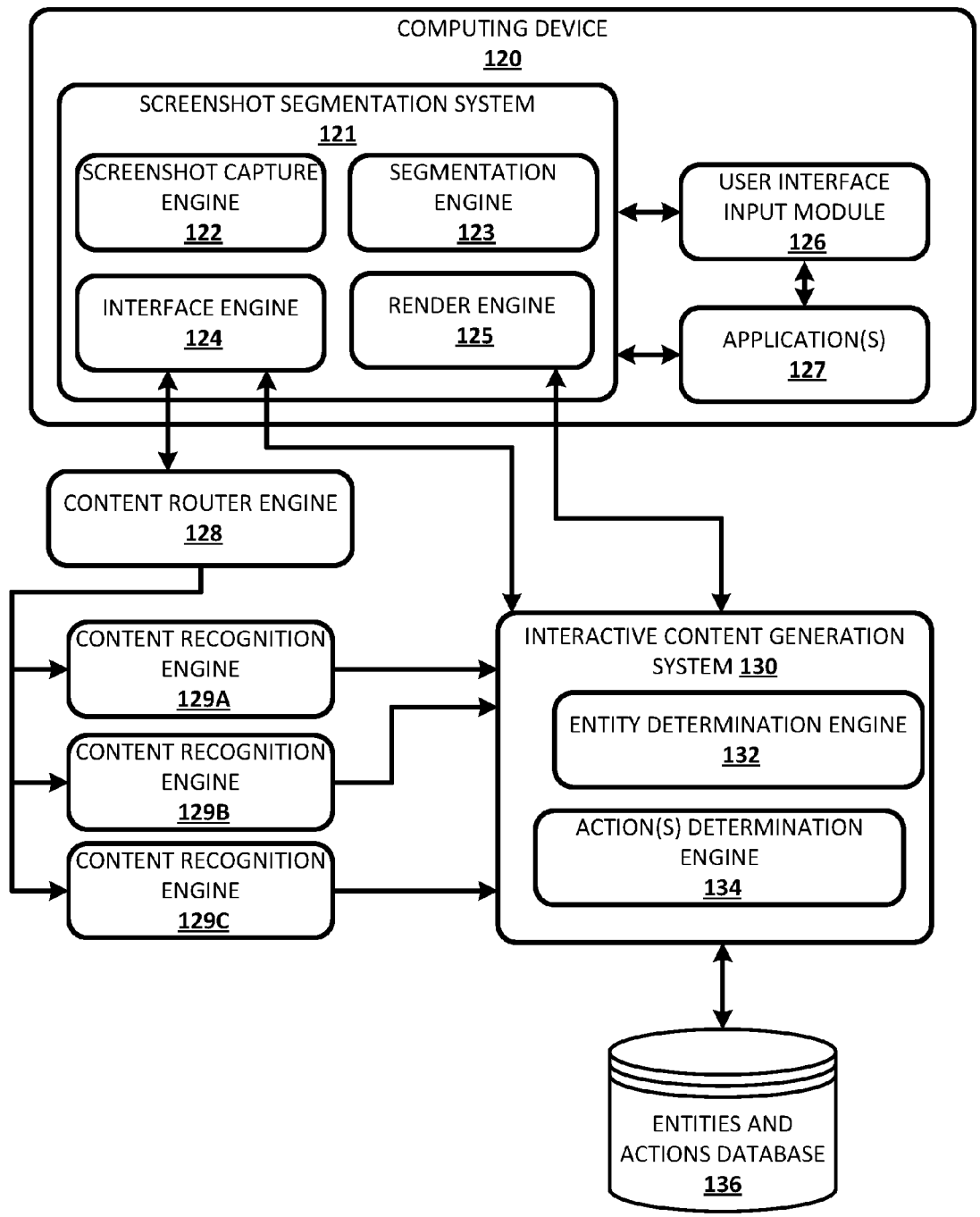
FIG. 1 is a block diagram of an example environment in which techniques disclosed herein may be implemented.

Implementations of this specification are directed to segmenting content displayed on a computing device into regions. Some implementations are further directed to generating, based on one or more of the regions, interactive content to provide for presentation to the user via the computing device. The interactive content presented to the user via the computing device may be configured, in response to selection via a user interface input device of the computing device, to cause the computing device to perform one or more actions that are tailored to one or more of the regions utilized to generate the interactive content.

In some implementations, a determined region and optionally the semantic type of that region may be utilized to generate interactive content that is related to visible content of the region. For example, a screenshot image of a display provided by a computing device may be segmented to determine a particular region of the display having a "photo" semantic type. The computing device may select a plurality of the pixels of that region and, based on that region being of a "photo" semantic type, may send those pixels to a recognition engine (that is on the computing device or remote from the computing device) that is configured to process photos. The recognition engine may identify, based on the pixels, content of the region, such as one or more entities present in the region, entities related to those present in the region, entity classes of those present in the region, etc. Interactive content may be generated that is tailored to the identified content and provided for presentation to the user via the computing device. For instance, the identified content may include one or more entities and the interactive content may, in response to user selection of the interactive content, cause the computing device of the user to access a webpage tailored to the identified entities, issue a search related to the identified entities, or access a state of an application—where that state is related to the identified entities.

In some implementations, a determined region having a certain semantic type (e.g., a semantic type indicative of an "image") may be utilized to provide interactive content that enables a computing device of a user to save (locally or remotely) a plurality of pixels of the determined region, share (e.g., via email, text, chat) those pixels, and/or designate those pixels to be sent to one or more engines (remote and/or local) for recognition and/or for generation of further interactive content based on that region. For instance, in response to determining a region and determining that the region has a semantic type of "image", interactive content directed to that image may be provided in response to a user selection (e.g., a long tap) of that region. This enables a computing device of a user to perform one or more actions focused on a particular region of a display of a user. The actions are presented to the user via interactive content generated based on analysis of pixels of a screenshot that includes that region, and without necessitating that the particular application displaying the region provide explicit support for extraction of the image.

In some implementations, generating interactive content based on a determined region may be in response to user interface input directed particularly to that determined region, such as a "long tap" of that region. In some of those implementations, interactive content generated based on the determined region may be provided more prominently than, or in lieu of, any content based on other non-selected regions that may be present on a display screen of the computing device. In other implementations, generating interactive content based on a determined region may be in response to a user interface input that is not directed particularly to the determined region, such as a "long tap" of a general interface element, a verbal command (e.g., "tell me more about what's on the screen"), etc.

In some implementations, segmenting a screenshot image of a display into one or more regions and/or determining a semantic type of one or more of the regions may be performed in whole or in part by one or more processors of a computing device that is generating the display. In some of those implementations, generating interactive content and/or providing the interactive content may be performed in whole or in part by one or more processors that are remote from the computing device. In some variations of these implementations, the one or more processors of the computing device may dictate, based on a determined semantic type of a region, which remote processors will process pixels from that region in generating interactive content. For example, regions having an image semantic label may be provided to a first recognition engine, regions having a text semantic label may be provided to a second recognition engine, etc.

Also, in some implementations, the one or more processors of the computing device may segment a display into one or more regions and/or determine a semantic type of one or more of the regions—and may utilize the regions and/or semantic types to limit the quantity of pixels that are utilized for one or more additional computing actions performed by the one or more processors of the computing device and/or by one or more remote processors. For example, the one or more processors of the computing device may segment a display into a plurality of regions having semantic types of "image", "text", and "nothing". The processors may provide pixels from the image region(s) to an image recognition engine (implemented by one or more processors of the computing device or by remote processor(s)) and may provide pixels from the text region(s) to a text recognition engine (implemented by one or more processors of the computing device or by remote processor(s)), but may not provide any pixels from the "nothing" region(s). This may conserve computational resources of the engines by reducing the number of pixels analyzed by the engines and/or may reduce Internet usage in implementations where one or more of the engines are remote from the computing device (i.e., because the pixels from the "nothing" region(s) are not transmitted to the remote engines).

As another example, the one or more processors of the computing device may only provide region(s) to one or more recognition engines when one or more additional characteristics of the region satisfy a threshold, where those additional characteristics are in addition to the semantic type of the region. Additional characteristics may include those that indicate one or more of: an absolute size of the region in the screenshot image, a relative size of the region in the screenshot image, a position of the region in the screenshot image, and a density of the pixels of the region in the screenshot image. For instance, very small images may not be sent, images that are not of high enough resolution (i.e., that don't have high enough density of pixels) for recognition by the recognition engine may not be sent, images that only take up a small portion of the screenshot image and/or that are in less prominent portions of the screenshot image may not be sent, etc.

Now turning to FIG. 1, an example environment in which techniques disclosed herein may be implemented is illustrated. The example environment includes computing device 120, content router engine 128, content recognition engines 129A-C, interactive content generation system 130, and entities and actions database 136. In some implementations, the computing device 120 is a portable mobile computing device such as a cellular phone, tablet computer, laptop computer, watch, head-mounted device (e.g., glasses), virtual or augmented reality device, other wearable device, an audio/video system, a navigation system, automotive and other vehicular system, etc.

Although content router engine 128, content recognition engines 129A-C, and interactive content generation system 130 are illustrated in FIG. 1 as separate from computing device 120, in some implementations all or aspects of one or more of those components may be implemented by computing device 120. Also, although screenshot segmentation system 121 is illustrated in FIG. 1 as part of computing device 120, in some implementations all or aspects of the system 121 may be implemented by one or more computing devices that are remote from computing device 120. In implementations where one or more components of FIG. 1 are implemented by one or more computing devices remote from computing device 120, the computing device 120 and the remote computing devices may communicate via one or more networks such as a local area network (LAN) and/or wide area network (WAN) (e.g., the Internet).

Computing device 120 is a client computing device and generates content for display to a user of the computing device 120 under various scenarios. For example, the computing device 120 may be executing one of the applications 127 and the content being generated for display to the user via a screen of the computing device 120 may be dictated at least in part by that application. Applications 127 may include one or more of a variety of applications that may be installed on the computing device 120 such as, for example, a web browser application, a personal assistant application, a business reviews application, a social networking application, a chat application, an SMS application, a music application, a video application, and/or an application that provides an interface for exploring information about movies, tv shows, and other media.

Screenshot segmentation system 121 at least selectively captures a screenshot image that captures at least a portion of a display being provided by the computing device 120 at the time the screenshot image was captured, and segments content displayed on the computing device 120 into one or more semantic regions based on pixels of the screenshot image. In some implementations, the screenshot segmentation system 121 further interfaces with content router engine 128 and/or interactive content generation system 130 to obtain interactive content that is based on one or more segmented regions. In some implementations, screenshot segmentation system 121 may be a stand-alone application. In some implementations, screenshot segmentation system 121 may be integrated, in whole or in part, as part of the operating system or firmware of the computing device 120.

Screenshot segmentation system 121 in the illustrated implementation includes a screenshot capture engine 122, a segmentation engine 123, an interface engine 124, and a render engine 125. Screenshot capture engine 122 captures screenshot images that each captures at least a portion of a display currently being provided to a user by the computing device 120.

In some implementations, the screenshot capture engine 122 captures a screenshot image in response to certain user interface input provided by user interface input module 126 in response to a user interacting with one or more user interface input devices of the computing device 120. For example, in some implementations, the screenshot capture engine 122 may capture a screenshot image in response to: a "tap" (e.g., short tap, long tap, tap with at least a threshold level of force) of a virtual user interface element via a touchscreen; an actuation of a mechanical interface element of the computing device 120; a verbal command provided to a microphone of the computing device 120; a tap of one or more areas of a touchscreen; etc. In some implementations, the screenshot capture engine 122 may additionally and/or alternatively capture a screenshot image in response to other criteria, such as the opening of a new application via the computing device 120, switching to a different virtual screen via the computing device 120, etc. In some implementations, the screenshot capture engine 122 may additionally and/or alternatively capture screenshot images continuously, periodically, and/or at another regular or irregular interval.

Segmentation engine 123 segments screenshot images captured by screenshot capture engine 122 into one or more semantic regions. In some implementations, the segmentation engine 123 analyzes a plurality of pixels of a screenshot image to determine one or more regions of the screenshot image and to assign a corresponding semantic type to each of the regions. A region defines a continuous area of the screenshot image and a semantic type of a region classifies content that is included in that region. Semantic types may include, for example, "image", "text region", "list items", etc.—and/or more granular types such as "photographic image", "image that is a painting", etc.

Segmentation engine 123 may utilize various techniques to determine regions of a screenshot image and/or semantic types of the regions. In some implementations, the segmentation engine 123 includes, or is in communication with, a trained machine learning model (e.g., a convolutional neural network (CNN) model) and the trained machine learning model may be utilized by the segmentation engine 123 to determine regions and/or semantic types of the regions. For example, the trained machine learning model may be trained, based on a plurality of training examples, to enable applying, as input to the model, a plurality of pixels of an image and to generate over the model, output that identifies regions of an input image and semantic labels of those regions. In some of those implementations, the model may be trained to receive a user selection as "side input" and to generate output that identifies a region that encompasses the user selection and that optionally identifies a semantic label of that region.

In some implementations, the segmentation engine 123 implements a heuristic particle extractor to determine regions of a screenshot image and/or semantic types of the regions. In some of those implementations, the heuristic particle extractor overlays a screenshot image with a grid of cells, such as a coarse-grained grid of square-shaped cells. For each cell of the grid, the heuristic particle extractor analyzes a fraction (e.g., less than 10%, such as 2.6%) of the pixels of the image that are encompassed by the cell and classifies the cell based on the analysis of the pixels. Each cell is classified according to which of a plurality of candidate classifications it belongs. For example, a cell may be binary classified as either "photo" or "not photo". The classification of the cells results in a matrix of cells that are each assigned a corresponding classification. For example, for a binary classification (e.g., photo/not photo), each cell may be assigned either a positive (e.g., photo) or negative (not photo) classification. Cells with a given classification may be covered with a minimal bounding box and intersecting bounding boxes merged. For example, in a binary classification, positive cells may be covered with a bounding box and intersecting boxes merged. Bounding boxes that fail to satisfy a size threshold may optionally be discarded. If the screenshot image was downscaled prior to analysis by the heuristic particle extractor, the bounding boxes may be upscaled to the original screenshot resolution. The bounding boxes identify positions of regions in the original screenshot and the classifications utilized to generate the bounding boxes identify the semantic label of those regions.

In some implementations, less than the entirety of the grid cells are processed by the heuristic particle extractor. For example, if the location of a user's selection (e.g., a tap on the display) is provided as "side input", analysis of the grid cells can begin at a grid cell corresponding to the location of the user's selection. The analysis progresses to adjacent cells so long as the bounding box continues to grow (i.e., so long as an adjacent cell in at least one direction has the same classification). When the bounding box stops growing in any direction, grid cells that extend beyond the limits of its possible growth in that direction will not be analyzed. When the bounding box stops growing in all directions, the analysis of grid cells can be stopped completely. Additional description of implementations of the heuristic particle extractor is provided in FIGS. 5, 6A, and 6B.

Interface engine 124 provides an interface with content router engine 128, interactive content generation system 130, and/or other component(s). The interface engine 124 provides content corresponding to one or more regions of a screenshot image to the content router engine 128 and/or to the interactive content generation system 130. For example, the interface engine 124 may provide a plurality of pixels of a region of a screenshot image and optionally an indication of a semantic label of the region. In some implementations, the interface engine 124 optionally analyzes one or more characteristics of a region and provides the region to one or more components only when those criteria satisfy one or more thresholds. Characteristics of a region may include a semantic label of the region and/or those that indicate one or more of: an absolute size of the region in the screenshot image, a relative size of the region in the screenshot image, a position of the region in the screenshot image, and a density of the pixels of the region in the screenshot image. For instance, the interface engine 124 may not provide content for a region when that region does not satisfy a size threshold (e.g., is a very small region), that region is not of high enough resolution (i.e., the pixels of the region are not a high enough density) for recognition by one or more of the content recognition engines 129A-C, and/or that region only takes up a small portion of the screenshot image and/or is in non-prominent portion of the screenshot image.

Render engine 125 manages the presentation of interactive content generated based on determined regions. For example, the render engine 125 may generate a visual display and/or audible output of generated interactive content for presentation to the user. For example, the render engine 125 may cause the interactive content to be displayed on a display screen of the computing device 120. For instance, the interactive content may be displayed in one or more information "cards" and/or in a "drop down menu", either of which may optionally be overlaid over at least a portion of the content captured by the screenshot image analyzed to generate the interactive content.

Additional description of engines 122-125 is provided herein. In some implementations, all or aspects of one or more of the engines 122-125 may be combined and/or implemented in another engine. For example, in some implementations one or more aspects of engine 124 may be incorporated in engine 123. Also, although engines 122-125 are illustrated in the example environment of FIG. 1 as being provided on computing device 120, this is not meant to be limiting. In other implementations, all or aspects of one or more of the engines 122-125 may be implemented on one or more computing devices that are remote from computing device 120.

The content router engine 128 determines which of a plurality of content recognition engines, such as engines 129A-C, will process the pixels for a given region provided by interface engine 124. Content recognition engines 129A-C are each configured to receive, as input, a plurality of pixels of a region, and to provide, as output, an indication of at least some of the content of that region. For example, content recognition engine 129A may be configured to receive pixels of a region that has a semantic label of photograph and to provide an indication of one or more entities that are present in an image formed by the pixels, such as one or more particular entities (e.g., entities indicative of the flowers daffodil and daisy) and/or an entity class (e.g., an entity indicative of flowers). Also, for example, content recognition engine 129B may be configured to receive pixels of a region that has a semantic label of text and to provide an indication of one or more characters and/or terms that are present in an image formed by the pixels. In some implementations, one or more of the engines 129A-C may include an image search system and/or a deep neural network, such as a CNN.

In some implementations, the content router engine 128 selects an engine for processing of pixels for a given region based at least in part on a semantic label for the given region. For example, content recognition engine 129A may be particularly configured to determine content present in regions having a semantic label indicative of a photographic image, engine 129B may be particularly configured to identify content present in regions having a semantic label indicative of non-photographic images, and engine 129C may be particularly configured to identify content present in regions having a semantic label indicative of text. In such an example, the content router engine 128 would provide pixels from a region having a semantic label indicative of a photographic image to content recognition engine 129B for processing of those pixels.

In some implementations, the content router engine 128 may utilize additional and/or alternative criteria in selecting a content recognition engine. For example, a size of a region, a resolution of the region, and/or other characteristic of the region may influence which content recognition engine is provided with pixels from the region. Also, for example, availability of the content recognition engines may be considered. Although content router engine 128 and content recognition engines 129A-C are illustrated in FIG. 1 as separate from the computing device 120, in some implementations one or more of those components may be implemented on the computing device 120.

The interactive content generation system 140 generates interactive content, for presentation to a user via the computing device 120, where the interactive content is tailored to content being displayed to the user by the computing device 120. The interactive content generation system 140 may generate the content based on one or more regions determined by segmentation engine 123, and optionally based on their semantic types. The interactive content generation system 140 includes an entity determination engine 132 and an action determination engine 134.

In some implementations, the entity determination engine 132 receives, from one of the content recognition engines 129A-C, an indication of the content present in a region of a screenshot image of content displayed to a user via the computing device 120. The entity determination engine 132 determines one or more entities referenced in the content based on the provided indication. An entity may be, for example, associated with one of a person, a location of interest, an address, a phone number, etc. In implementations, the indication explicitly indicates an entity and the entity determination engine 132 may select that entity and/or one or more related entities as entities that will be the focus of one or more aspects of generated interactive content.

In some implementations, the indication provided by one of the content recognition engines 129A-C does not explicitly indicate an entity. For example, one of the content recognition engines 129A-C may provide text that is present in a textual region, but not explicitly indicate any entity associated with the text. In some of those implementations, the entity determination engine 132 may determine one or more entities based on such information. For instance, entity determination engine 142 may determine one or more entities that are strongly associated with text or other information in one or more entity databases, such as a knowledge graph. For example, the text may be most strongly associated with an alias of a particular entity.

In some implementations, the action determination engine 134 determines one or more computer-based actions that can be performed for the entity (or entities) determined by entity determination engine 132. In some of those implementations, the action determination engine 134 determines the computer-based actions based on the computer-based actions being mapped to the entity in one or more databases such as entities and actions database 136. The entities and actions database 136 includes a mapping of each of a plurality of entities to one or more computer-based actions associated with the entity. An action may be directly mapped with an entity and/or may be indirectly mapped to the entity via a mapping with a class of the entity. For example, the action of dialing a phone number may be mapped to each of a plurality of particular phone numbers and/or may be associated with the class of phone numbers in general. Also, for example, the action of playing a movie may be mapped to each of a plurality of movies, movies in general, and/or only movies that are available for on-demand viewing via one of the applications 127 installed on the computing device 120.

In implementations where multiple actions are identified for an entity, the action determination engine 134 may optionally rank and/or filter the identified actions based on one or more factors such as, for example: strengths of association of the actions to the entity and/or a class of the entity; historical popularity of the actions in general; historical popularity of the actions for the application from which the content originated; whether the actions are performable via one or more applications 127 installed on the computing device 120; historical popularity of performance of the actions via one or more applications 127 installed on the computing device 120; etc.

The interactive content generation system 130 generates, based on the actions determined by engine 134, interactive content to be presented to the computing device 120. The interactive content may be in visual, audible, and/or other form capable of being provided the user via one or more user interface output devices of the computing device 120. As one example, the interactive content may include a graphical element (text, icon, and/or an image) that, when selected by a user via a user interface input device of the computing device 120, causes the computing device 120 to perform one or more actions. For example, the graphical element may be associated with a link that causes performance of the one or more actions. Actions may include, for example, accessing a particular webpage, issuing a particular search, accessing a particular state of an application, rendering additional media, etc. Multiple items of interactive content may optionally be generated and interactive content may optionally be provided in combination with non-interactive content, such as content that includes an alias or other properties of one or more entities.

In some implementations, action determination engine 134 may optionally determine one or more actions independent of input from entity determination engine 132 and/or any of content recognition engines 129A-C. For example, in some implementations the interactive content may enable a user of the computing device to save a plurality of pixels of a determined region, share those pixels, and/or designate those pixels to be sent to one or more additional components for recognition of content in that region and/or for generation of further interactive content based on that region. In some of those implementations, the action determination engine 134 may generate the interactive content based on the region having a particular semantic label and/or having one or more additional characteristics. For example, in response to determining that a region has a semantic type of one or more particular semantic types (e.g., a semantic type indicative of an "image" or any semantic type that is not "null/nothing"), interactive content may be provided that enables a user to perform one or more actions that are focused on that region. For instance, in response to determining a region and determining that the region has a semantic type of "image", interactive content directed to that image may be generated and configured to be displayed in response to a user selection (e.g., a long tap) of that region. The interactive content may enable a computing device of a user to perform one or more actions focused on the region.

Figure 2:
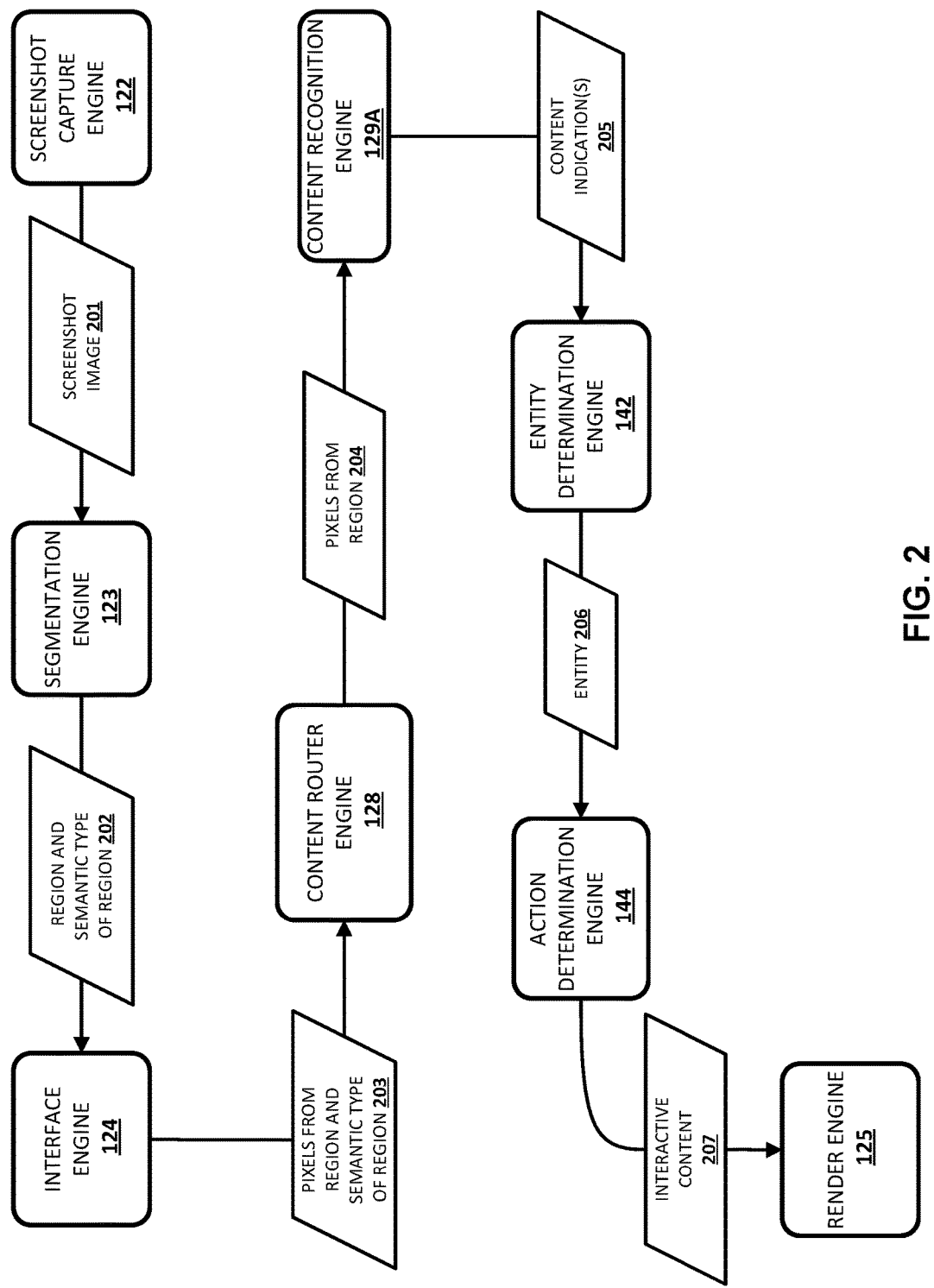
FIG. 2 illustrates an example of segmenting content displayed on a computing device into regions and generating, based on one of the regions, interactive content to provide for presentation to the user via the computing device.

FIG. 2 illustrates an example of segmenting content displayed on the computing device 120 into regions and generating, based on one of the regions, interactive content 207 to provide for presentation to the user via the computing device 120. In FIG. 2, screenshot capture engine 122 captures a screenshot image 201 that captures at least a portion of a display provided to a user via a display screen of the computing device 120. The screenshot capture engine 122 provides the screenshot image 201 to the segmentation engine 123.

The segmentation engine 123 analyzes a plurality of pixels of the screenshot image 201 to determine one or more regions of the screenshot image and to assign a corresponding semantic type to each of the regions. Segmentation engine 123 may utilize various techniques to determine regions of a screenshot image and/or semantic types of the regions. In some implementations, the segmentation engine 123 includes, or is in communication with, a trained machine learning model (e.g., a convolutional neural network (CNN) model) and the trained machine learning model may be utilized by the segmentation engine 123 to determine regions and/or semantic types of the regions. In some implementations, the segmentation engine 123 implements a heuristic particle extractor to determine regions of a screenshot image and/or semantic types of the regions.

The segmentation engine 123 provides one of the regions and a semantic type of the region 202 to interface engine 124. Interface engine 124 extracts a plurality of (e.g., all of, or a subset of) the pixels of the screenshot image that correspond to the region and provides the pixels and an indication of the semantic type of the region 203 to the content router engine 128. In some implementations, the interface engine 124 provides the pixels and an indication of the semantic type of the region 203 in response to user interface input, such as general user interface input or user interface input that is directed particularly to the region. In some implementations, the interface engine 124 provides the pixels and an indication of the semantic type of the region 203 based on determining that one or more characteristics of the region satisfy one or more thresholds.

The content router engine 128 selects content recognition engine 129A from a plurality of content recognition engines and provides pixels from the region 204 to the engine 129A. In some implementations, the content router engine 128 selects the content recognition engine 129A based on the semantic type of the region as described herein. In some implementations, the content router engine 128 selects the engine 129A based on additional and/or alternative criteria, such as characteristic(s) of the region. In some implementations, the router 128 may pre-process the pixels provided to the engine 129A based on properties of the engine 129A. For example, the router 128 may alter the size and/or resolution of an image formed by the provided pixels to achieve an image that is capable of being processed by engine 129A or that is more appropriately formatted for processing by engine 129A.

The content recognition engine 129A determines, based on the pixels from the region 204, one or more content indications 205 that are indicative of at least some of the content of those pixels. The engine 129A provides the content indications 205 to entity determination engine 142. The entity determination engine 142 determines at least one entity 206 referenced in the content based on the provided content indications 205.

The entity determination engine 142 provides the entity 206 to the action determination engine 144. The action determination engine 144 determines one or more computer-based actions that can be performed that are related to the entity 206 and generates interactive content 207 that enables performance of those actions.

The engine 144 provides the interactive content 207 to render engine 125 for presentation of the interactive content 207 by the render engine 125. In some implementations, the render engine 125 displays the interactive content 207 by either supplanting the displayed content captured by the screenshot image 201 or by providing the interactive content "over" portions of the displayed content captured by the screenshot image 201.

Figure 4A:
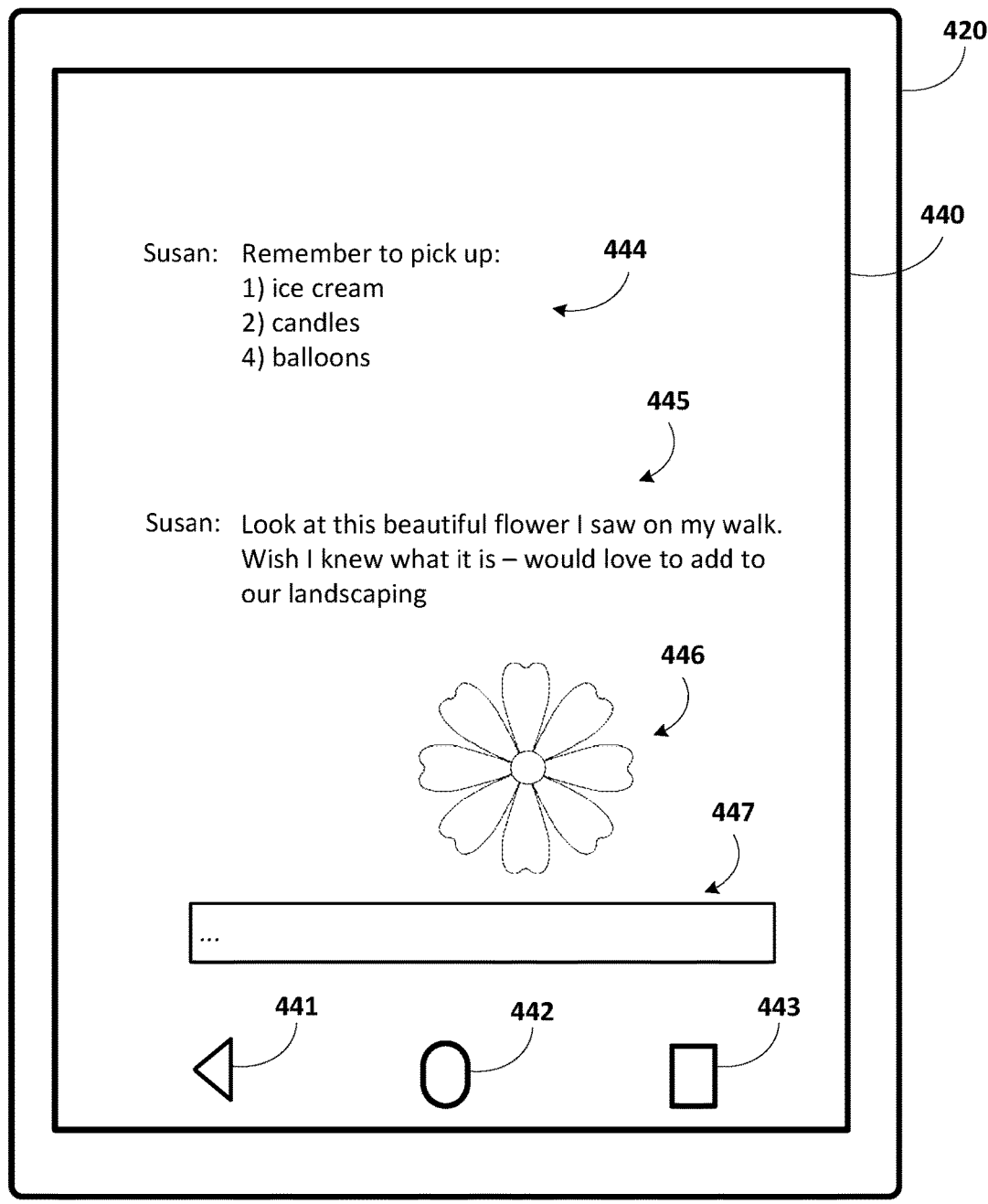
FIG. 4A illustrates an example mobile computing device and content that is being displayed on a display screen of the mobile computing device.

Turning now to FIGS. 4A-4D, some implementations of particular examples of the example of FIG. 2, and of other implementations described herein, are described in additional detail. In FIG. 4A the computing device 420 is displaying the illustrated content on a display screen 440 of the computing device 420. The content displayed on the display screen 440 may be displayed by a messaging application executing on the computing device 420, such as a messaging application that does not incorporate functionality for extraction of images, text, and/or other content from the messaging application. The content displayed on the display screen 440 includes first textual content 444 included in a first message sent to a user of the computing device 420 by "Susan". The content also includes second textual content 445 and a first image 446 that are included in a second message sent to the user by Susan. The content further includes a reply interface element 447 that the user may select to generate a reply message and includes system interface elements 441, 442, 443 that may be interacted with by the user to cause the computing device 420 to perform one or more actions.

Figure 4B:
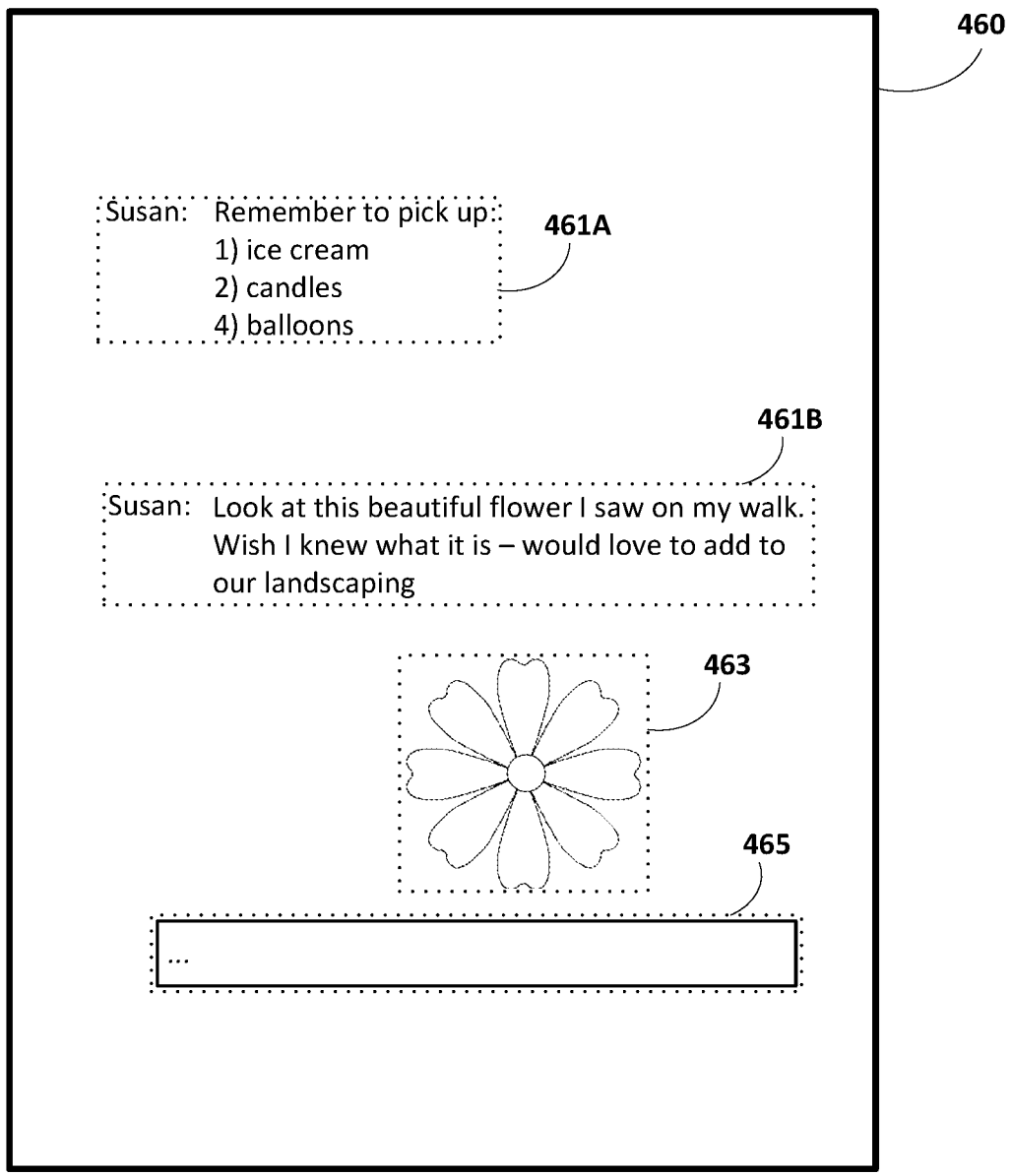
FIG. 4B illustrates a screenshot image of the content being displayed in FIG. 4A, and illustrates example regions that may be determined based on the screenshot image.

FIG. 4B illustrates a screenshot image 460 of the content being displayed by the computing device 420 in FIG. 4A. The screenshot image 460 may be captured by the screenshot capture engine 122. The screenshot image 460 of FIG. 4B omits the system interface elements 441-443 (e.g., the screenshot may only capture the area "above" those elements), although they may be included in a screenshot image in other implementations. Indications of the regions determined by the segmentation engine 123 based on the screenshot image are also illustrated in FIG. 4B. Region 461A encompasses the first textual content 444 and may have a first semantic type such as "text." Region 462A encompasses the second textual content 445 and may also have the first semantic type. Region 463 encompasses the first image 446 and may have a second semantic type such as "image". Region 465 encompasses the reply interface element 447 and may have a third semantic type such as "UI element". Another region that encompasses all of the area of the screenshot image 460 not encompassed by regions 461A, 461B, 463, or 465 may also be generated and may have a fourth semantic type such as "nothing." Although the regions are illustrated graphically in FIG. 4B, it is understood that segmentation engine 123 may define the regions in various manners. For example, the segmentation engine 123 may define a region as a center pixel of the region and all pixels within a pixel width and pixel height of that center pixel.

Figure 4C:
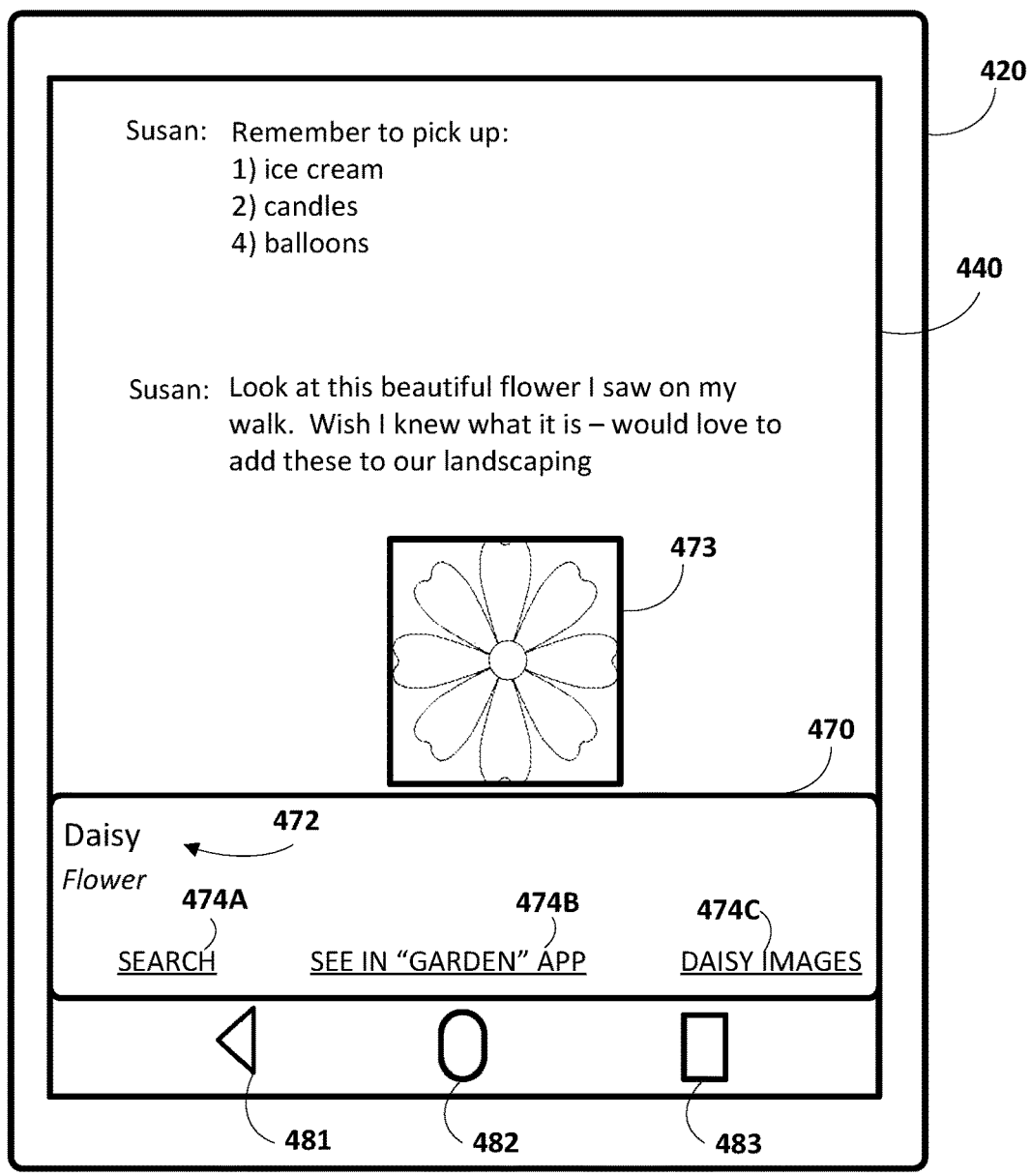
FIG. 4C illustrates the example mobile computing device of FIG. 4A and one example of interactive content that may be displayed by the mobile computing device.

FIG. 4C illustrates the example mobile computing device 420 of FIG. 4A and one example of interactive content that may be displayed by the mobile computing device 420. In some implementations of FIG. 4C a user of the computing device may have provided user interface input directed particularly to the region 463 (FIG. 4B) that encompasses the image of the flower, such as a "long tap" or "long click" of that region or a verbal input directed to that region (e.g., verbal input of "tell me more about the image on the screen"). Based on the user interface input being directed to the region 463, the interface engine 124 may provide pixels of region 463 to content router engine 128, optionally along with an indication of the semantic type of that region (e.g., "image"). In some implementations, the interface engine 124 provides pixels of the region 463 without providing pixels from any other of the regions. In some of those implementations, not providing pixels from any other of the regions may result in less consumption of computational resources by one or more downstream components (e.g., since they don't have to also analyze those pixels) and/or reduced network traffic (e.g., when downstream component(s) are remote from the computing device 420).

The content router engine 128 may provide the pixels to one of the content recognition engines 129A-C, optionally based on that engine being configured to process pixels associated with the semantic type. That engine may analyze the pixels and determine one or more indications of content of the pixels, such as an indication that the image is of a daisy flower.

The interactive content generation system 130 may utilize the indication of content to generate interactive content such as graphical elements 474A, 474B, and 474C. For example, the interactive content generation system 130 may generate the graphical element 474A so that selection of graphical element 474A causes the computing device 420 to perform one or more actions that cause a search to be issued that is related to a daisy flower (e.g., a search of "daisy" or of "daisy flower"). Also, for example, the interactive content generation system 130 may generate the graphical element 474B so that selection of graphical element 474B causes the computing device 420 to perform one or more actions that cause a particular state of a "garden" application of applications 127 to be accessed. For instance, selection of graphical element 474B may cause the computing device 420 to open the garden application and to navigate to a state of that application that is focused on the daisy flower, or ornamental flowers in general. Also, for example, the interactive content generation system 130 may generate the graphical element 474C so that selection of graphical element 474C causes the computing device 420 to retrieve and/or display one or more additional images of daisy flowers.

The interactive content generation system 130 further generates non-interactive content 472 that provides an indication of the entity shown in the image ("Daisy") and an indication of a class of that entity ("Flower"). The content generated by interactive content generation system 130 is displayed in a graphical "card" 470 that overlays other content on the display screen 440. Further, an indication 473 is provided that conforms to the region 463 to provide the user of the computing device with feedback to let the user know that the content of graphical card 470 is directed to the region 463 and/or is provided based on the user's selection of that region 463. Generation and/or formatting of the indication 473 and/or of the graphical card 470 may be performed by the interactive content generation system 130 and/or the render engine 125.

Figure 4D:
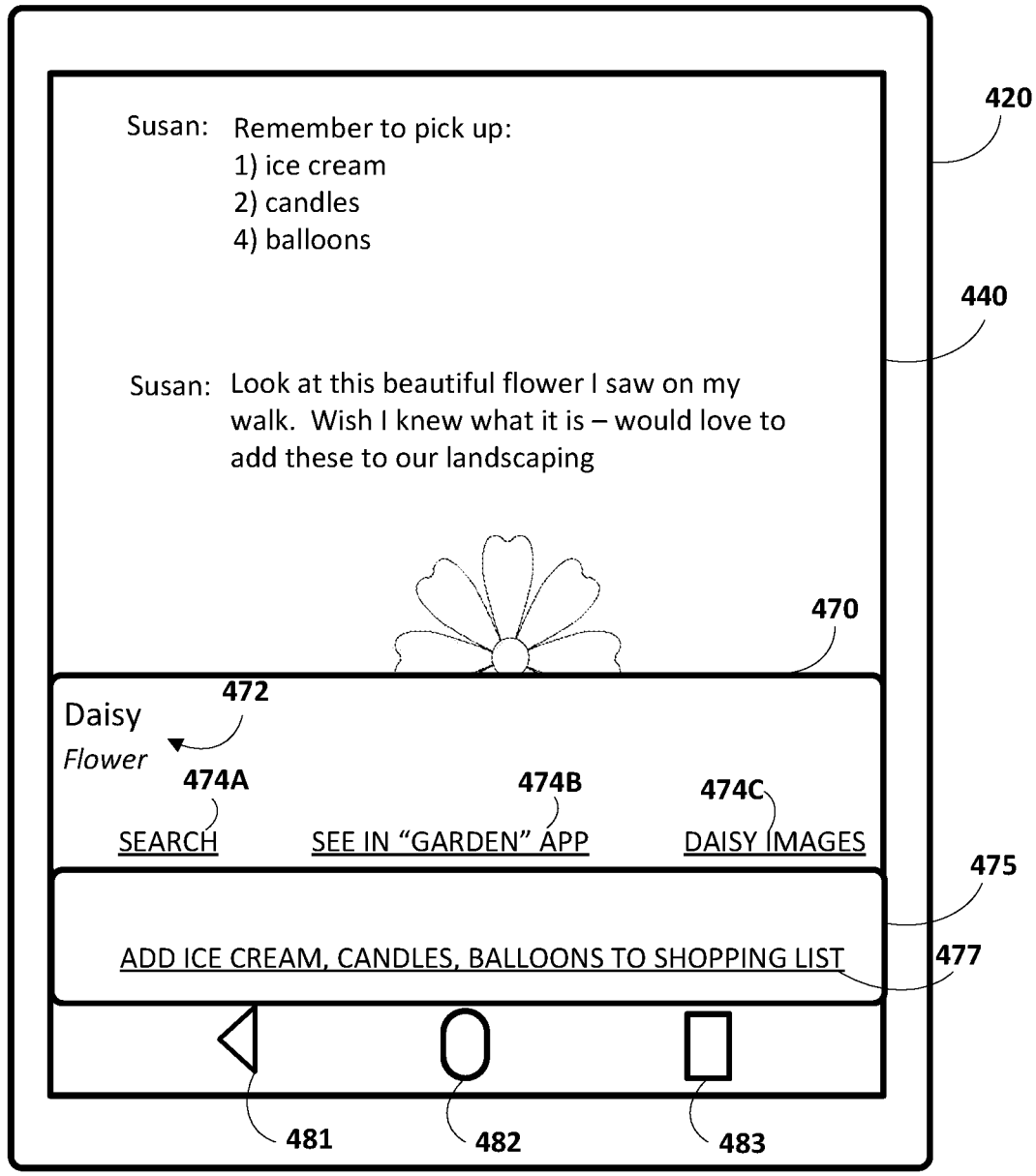
FIG. 4D illustrates the example mobile computing device of FIG. 4A and another example of interactive content that may be displayed by the mobile computing device.

FIG. 4D illustrates the example mobile computing device 420 of FIG. 4A and another example of interactive content that may be displayed by the mobile computing device 420. In some implementations of FIG. 4D, a user of the computing device may have provided user interface input that is not directed to any particular region, such as a "long tap" or "long click" on system element 482 or general verbal input (e.g., verbal input of "tell me more about what's on the screen"). Based on the user interface input being more general, the interface engine 124 may provide pixels of multiple regions to content router engine 128, optionally along with indications of the semantic types of those regions. For example, the interface engine 124 may provide pixels from each of regions 461A, 461B, and 463. In some implementations, the interface engine 124 provides pixels of the regions 461A, 461B, and 463 without providing pixels from any other of the regions (e.g., the "nothing" region and/or the "UI element" region 465). In some of those implementations, not providing pixels from any other of the regions may result in less consumption of computational resources by one or more downstream components (e.g., since they don't have to also analyze those pixels) and/or reduced network traffic (e.g., when downstream component(s) are remote from the computing device 420).

The content router engine 128 may provide the pixels for each of the regions to one or more of the content recognition engines 129A-C, optionally based on the semantic type of the region. For example, the router 128 may provide pixels of region 463 to content recognition engine 129A, the pixels of region 461A to content recognition engine 129B, and the pixels of region 461B to content recognition engine 129B. Those engines may analyze those pixels and determine one or more indications of content of the pixels. For example, engine 129A may provide an indication that region 463 includes a daisy flower and engine 129B may provide an indication that region 461A includes a list of items and may provide the text of those items.

The interactive content generation system 130 may utilize the indication of content to generate interactive content such as graphical elements 474A, 474B, 474C, and 477. Graphical elements 474A-C are the same as those illustrated in FIG. 4C. The interactive content generation system 130 may also generate the graphical element 477 so that selection of graphical element 477 causes the computing device 420 to add the listed items (derived from an indication of content in region 461A) to a shopping list, such as shopping list maintained by one or more of the applications 127 of the computing device 420.

The interactive content generation system 130 further generates non-interactive content 472 that provides an indication of the entity shown in the image ("Daisy") and an indication of a class of that entity ("Flower"). The content generated by interactive content generation system 130 that relates to the content of the region 363 is provided in a first graphical "card" 470 that overlays other content on the display screen 440. The content generated by interactive content generation system 130 that relates to the content of the region 361A is provided in a visually separate second graphical "card" 475 that also overlays other content on the display screen 440. Generation and/or formatting of the cards 470 and 475 may be performed by the interactive content generation system 130 and/or the render engine 125.

Figure 3:
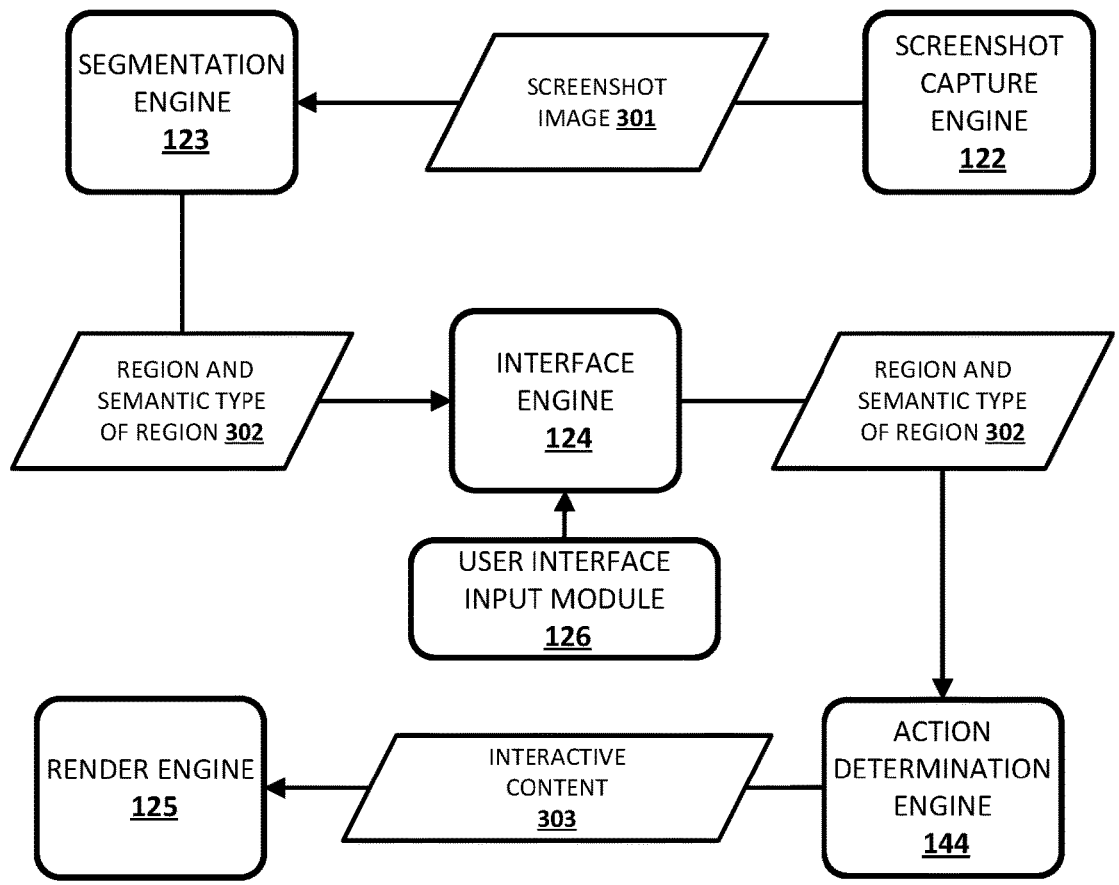
FIG. 3 illustrates another example of segmenting content displayed on a computing device into regions and generating, based on one of the regions, interactive content to provide for presentation to the user via the computing device.

Referring now to FIG. 3, another example is illustrated of segmenting content displayed on a computing device into regions and generating, based on one of the regions, interactive content to provide for presentation to the user via the computing device. In FIG. 3, screenshot capture engine 122 captures a screenshot image 301 that captures at least a portion of a display provided to a user via a display screen of a computing device. The screenshot capture engine 122 provides the screenshot image 301 to the segmentation engine 123.

The segmentation engine 123 analyzes a plurality of pixels of the screenshot image 301 to determine one or more regions of the screenshot image and to assign a corresponding semantic type to each of the regions. Segmentation engine 123 may utilize various techniques to determine regions of a screenshot image and/or semantic types of the regions.

The segmentation engine 123 provides one of the regions and a semantic type of the region 302 to interface engine 124. Interface engine 124 provides the region and an indication of the semantic type of the region 302 to the action determination engine 144. In some implementations, the interface engine 124 provides the region and an indication of the semantic type of the region 302 in response to a user interface input, provided by user interface input module 126, that is directed particularly to the region, such as a long tap or other selection directed to the region.

The action determination engine 144 determines one or more computer-based actions that can be performed based on the provided semantic type of the region. For example, for a region having a semantic type of "image", the action determination engine 144 may provide interactive content that enables a computing device of a user to save (locally or remotely) a plurality of pixels of the determined region, share (e.g., via email, text, chat) those pixels, and/or designate those pixels to be sent for a remote server for recognition and/or for generation of further interactive content based on that region. This enables a computing device of a user to perform one or more actions focused on a particular region of a display of a user.

The action determination engine 144 provides the interactive content 304 to the render engine 125, which presents the interactive content 304.

Figure 4E:
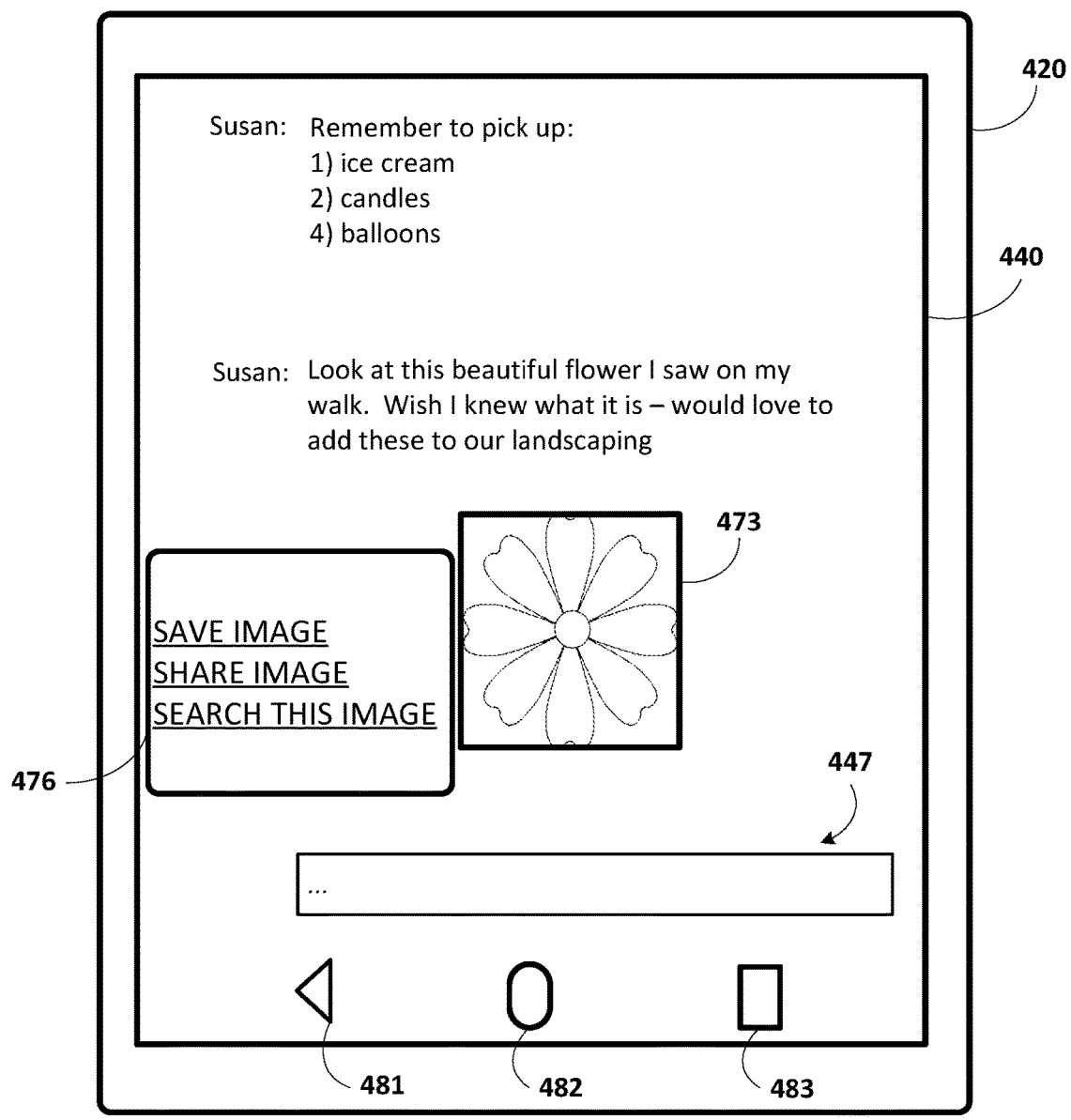
FIG. 4E illustrates the example mobile computing device of FIG. 4A and yet another example of interactive content that may be displayed by the mobile computing device.

Turning now to FIG. 4E, a particular implementation of the example of FIG. 3, and of other implementations described herein, is described in additional detail. FIG. 4E illustrates the computing device 420 and interactive content that may be provided for display to the user via display screen 440. The interactive content may be provided in response to user interface input directed particularly to the region 463 (FIG. 4B) that encompasses the image of the flower. For example, the user may provide the user interface input while viewing the display of FIG. 4A. The user interface input may be, for example, a "long tap" or "long click" of that region or a verbal input directed to that region (e.g., verbal input of "select the image on the screen").

Based on the user interface input being directed to the region 463, the interface engine 124 may provide the region 463 and an indication of the semantic type of the region to action determination engine 144. The action determination engine 144 may determine computer actions that can be performed on regions having the semantic type and/or determine instructions for extracting pixels corresponding to the region 463. The action determination engine may 144 further generate interactive content, such as the graphical elements "save image", "share image", and "search this image" illustrated in pop-up window 476.

The action determination engine 134 may generate the graphical element "save image" so that selection of it causes the computing device 420 to automatically extract one or more (e.g. all) of the pixels of region 463 for saving on a local or remote storage medium—and either automatically save the image or present the user with one or more further interfaces to specify where the user would like to save the image. The action determination engine 134 may generate the graphical element "share image" so that selection of it causes the computing device 420 to automatically extract one or more (e.g. all) of the pixels of region 463 for population in an email, chat, or other communication—and either automatically populate the image in the communication or present the user with one or more further interfaces to specify in which type of communication it should be populated. The action determination engine 134 may generate the graphical element "search image" so that selection of it causes the computing device 420 to cause a search to be issued based one or more (e.g. all) of the pixels of region 463. Further, an indication 473 is provided that conforms to the region 463 to provide the user of the computing device with feedback to let the user know that the interactive content is directed to the region 463 and is provided based on the user's selection of that region 463.

Figure 5:
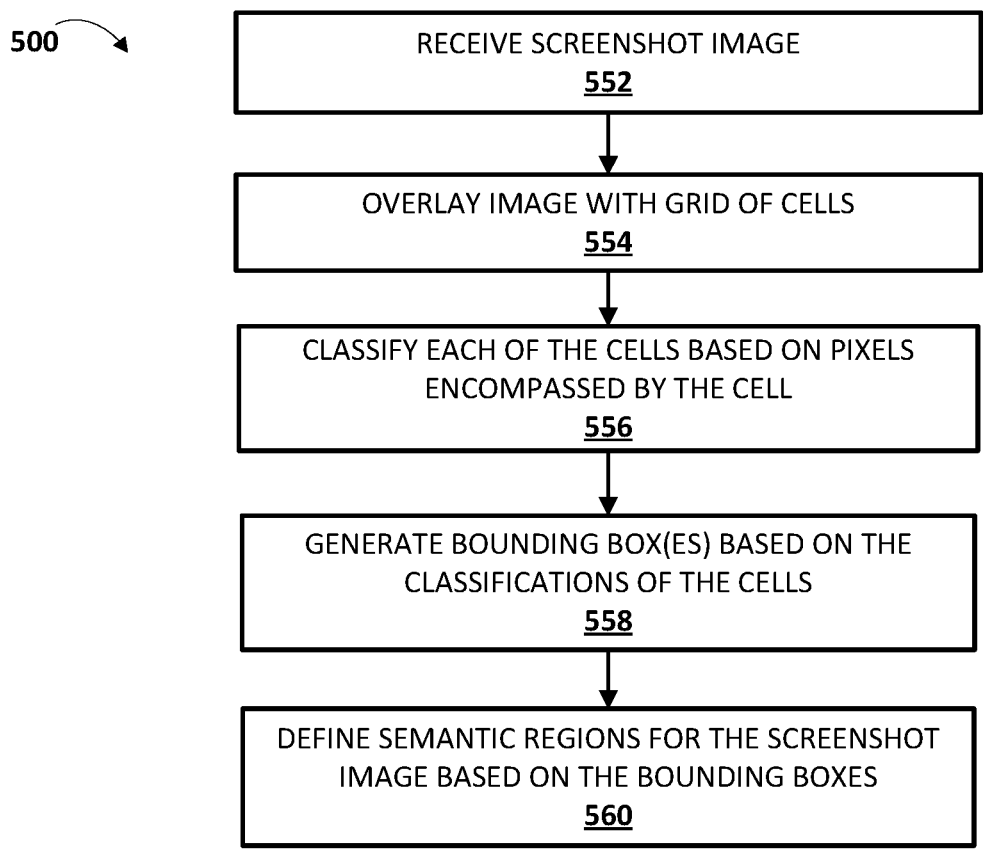
FIG. 5 is a flowchart illustrating an example method of segmenting a screenshot image into one or more regions.

FIG. 5 is a flowchart illustrating an example method 500 of segmenting a screenshot image into one or more regions utilizing a heuristic particle extractor. For convenience, the operations of the flow chart are described with reference to a system that performs the operations. This system may include various components of various computer systems, such as segmentation engine 123. Moreover, while operations of method 500 are shown in a particular order, this is not meant to be limiting. One or more operations may be reordered, omitted or added.

At block 552, the system receives a screenshot image. The screenshot image captures at least a portion of a display provided to a user by a computing device of the user. As a working example, assume the system receives the screenshot image 460 of FIG. 4B.

Figure 6A:
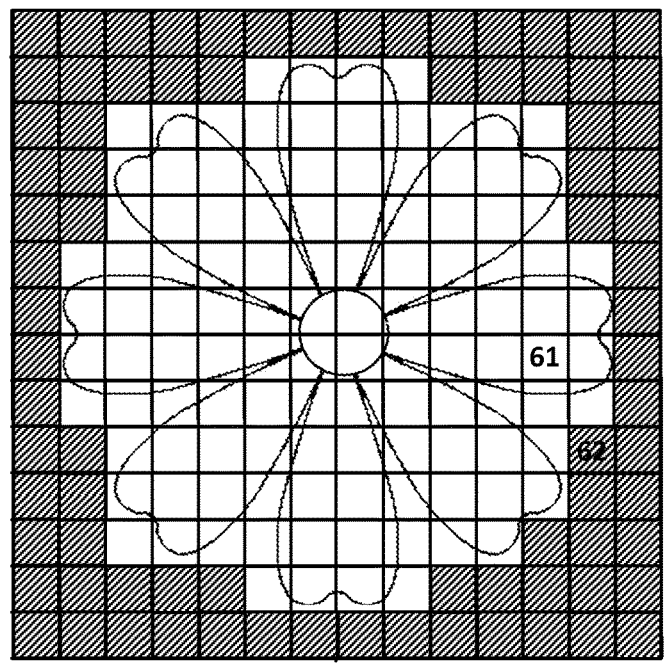
FIG. 6A is an example of grid cells and classifications of grid cells that may be determined based on the method of FIG. 5.

At block 554, the system overlays the screenshot image with a grid of cells. In some implementations, the grid of cells may be coarse grained and/or square cells. For example, the grid of cells may be square cells that are each less than 0.2" by 0.2", such as less than 0.1" by 0.1" (e.g., 0.9" by 0.9"). Continuing with the working example, FIG. 6A illustrates a portion of the screenshot image 460 of FIG. 4B (i.e., a portion that encompasses the flower) and illustrates a grid of cells that may be overlaid on the screenshot image 460. Note that for ease in illustration the grid cells of FIG. 6A are shown larger than they may be in various implementations.

At block 556, the system classifies each of the cells based on pixels encompassed by the cell. In some implementations, for each of a plurality of cells of the grid, the system analyzes a subset (e.g., less than 10%, such as 2.6%) of the pixels of the image that are encompassed by the cell and classifies the cell based on the analysis of the subset of the pixels. In some implementations, the pixels of the subset may be sparsely scattered low-discrepancy quasi-random pixels, such as pixels selected based on quasi-random sub-sampling utilizing a Halton sequence and/or Sobol sequence.

The system classifies each cell according to which of a plurality of candidate classifications it belongs. For example, a cell may be binary classified as either "photo" or "not photo". Continuing with the working example, FIG. 6A illustrates those cells classified as "not photo" with shading and illustrates those cells classified as "photo" without shading. For example, cell 61 is classified as "photo" and cell 62 is classified as "not photo".

The system may utilize one or more techniques to classify a given cell. For example, in some implementations a cell may be classified as "photo" or "not photo" based on a count of the number of unique colors of analyzed pixels and/or a quantity of the pixels present for each of one or more of the unique colors. For instance, if at least a threshold number of unique colors of pixels are present in a cell and/or at least a threshold number of pixels are present for one or more of the unique colors, the cell may be classified as "photo". As another example, the pixels of the cell may be provided as input to a trained classifier trained to predict a classification based on a group of pixels. Regardless of the technique utilized for classification, the classification of the cells results in a matrix of cells that are each assigned a corresponding classification.

Figure 6B:
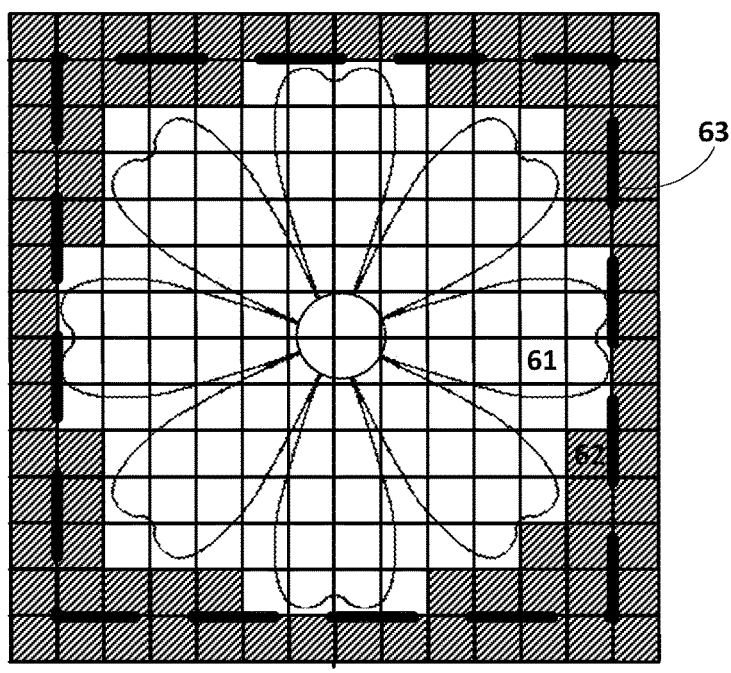
FIG. 6B illustrates the grid cells and classifications of grid cells of FIG. 6A, and also illustrates a bounding box that may be determined based on the method of FIG. 5.

At block 558, the system generates bounding box(es) based on the classifications of the cells. For example, in a binary classification, the system may cover "positive" cells and merge any intersecting bounding boxes. The system may optionally discard any bounding boxes that fail to satisfy a size threshold. Continuing with the working example, FIG. 6B shows the grid cells of FIG. 6A, with a bounding box 63 also illustrated. The bounding box 63 may be generated at block 558 and defines one of multiple regions of the screenshot image 460.

At block 560, the system defines semantic regions for the screenshot image based on the bounding boxes. If the screenshot image was downscaled prior to analysis by one or more blocks, the system may upscale the bounding boxes to the original screenshot resolution in defining the regions. The (optionally upscaled) bounding boxes identify positions of regions in the original screenshot. The system may utilize the classifications utilized to generate the bounding boxes to identify the semantic label of those regions. Continuing with the working example, the system may define a region that is based on the bounding box 63 of FIG. 6B with a semantic label indicative of a "photo" or other image, based on the bounding box 63 being generated based on cells classified as "photo". In some implementations, the system may also fine tune coarse edges of a region by looking for exact edges in a neighborhood of detected coarse edges. Whether edges of a given region are fine-tuned by the system may depend on an intended use of the regions by the system. For example, fine-tuning an edge may be unnecessary for analysis of a region by a recognition engine, but may be desirable when the region is to be extracted and saved, sent to another user, etc.

In some implementations, the system processes less than the entirety of the cells of the grid in one or more blocks, such as blocks 556 and 558. For example, if the location of a user's selection (e.g., a tap on the display) is provided as "side input" to the system, analysis of the grid cells can begin at a grid cell corresponding to the location of the user's selection. The analysis progresses to adjacent cells so long as the bounding box continues to grow (i.e., so long as an adjacent cell in at least one direction has the same classification). When the bounding box stops growing in any direction, grid cells that extend beyond the limits of its possible growth in that direction will not be analyzed. When the bounding box stops growing in all directions, the analysis of grid cells can be stopped completely. In some of these implementations, a particular region of a screenshot image that corresponds to user interface input may be determined without necessitating the analysis of pixels in many cells that are outside of that particular region.

Figure 7:
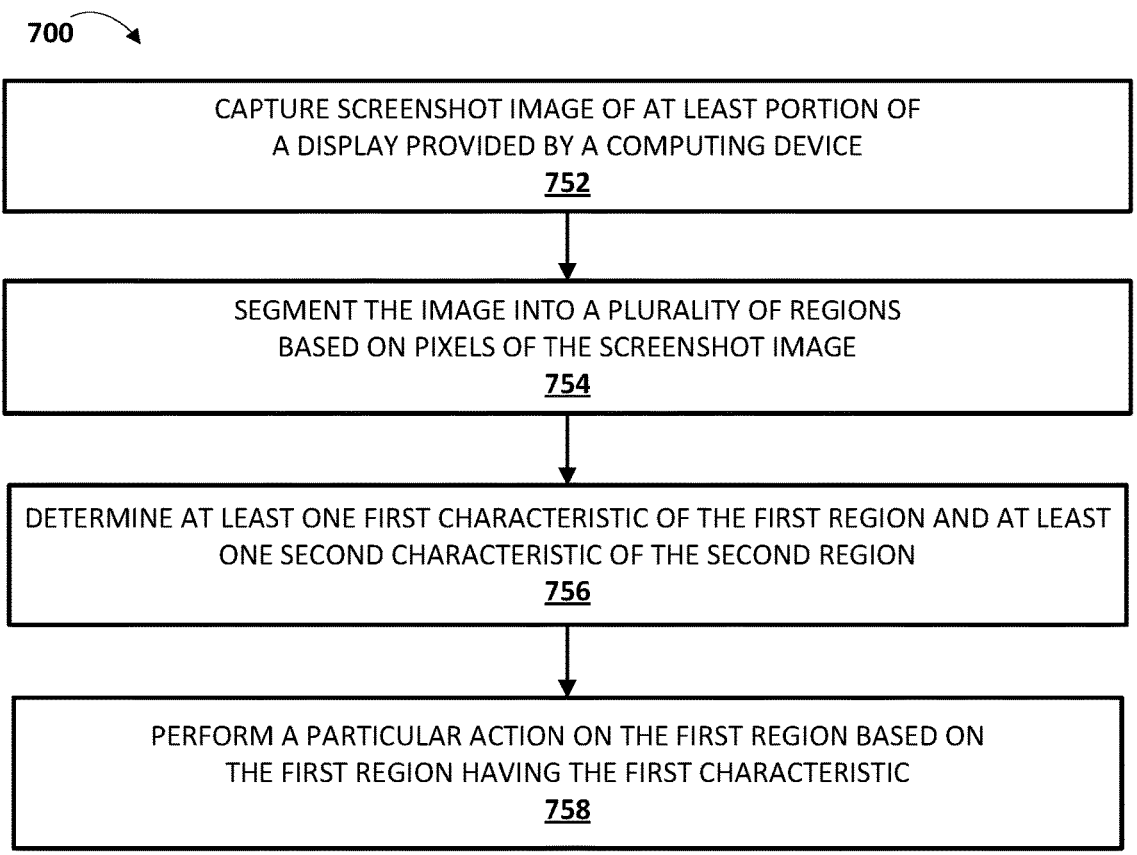
FIG. 7 is a flowchart illustrating an example method of segmenting content displayed on a computing device into regions and performing one or more actions on a region based on one or more characteristics of the region.

FIG. 7 is a flowchart illustrating an example method 700 of segmenting content displayed on a computing device into regions and performing one or more actions on a region based on one or more characteristics of the region. This system may include various components of various computer systems, such as one or more components of screenshot segmentation system 121, content router engine 128, content recognition engines 129A-C, and/or interactive content generation system 130. Moreover, while operations of method 700 are shown in a particular order, this is not meant to be limiting. One or more operations may be reordered, omitted or added.

At block 752, the system captures a screenshot image of at least a portion of a display provided by a computing device.

At block 754, the system segments the image into a plurality of regions based on pixels of the screenshot image. The system may utilize various techniques to determine regions of a screenshot image. For example, in some implementations the system includes, or is in communication with, a trained machine learning model and the trained machine learning model may be utilized by the system to determine the regions. In some implementations, the system implements a heuristic particle extractor to determine regions of a screenshot image.

At block 756, the system determines at least one first characteristic of the first region and determines at least one second characteristic of the second region. In some implementations, the first characteristic is a first semantic type and the second characteristic is a second semantic type. In some implementations, the characteristic(s) of the first region and/or the second region include an absolute size of the corresponding region in the screenshot image, a relative size of the corresponding region in the screenshot image, a position of the corresponding region in the screenshot image, and a density of the pixels of the corresponding region in the screenshot image At block 758, the system performs a particular action on the first region based on the first region having the first characteristic. For example, the system may: provide the pixels of the first region for content recognition by a content recognition engine based on the first region having the first characteristic; provide the pixels of the first region for content recognition by a particular content recognition engine adapted for the first characteristic based on the first region having the first characteristic; may enable the first region to be selected via user interface input to cause saving of pixels of the first region, sending of pixels of the first region in one or more communications, sending of pixels of the first region to one or more content recognition engines; and/or other action.

In some implementations, the system does not perform the particular action on the second region based on the second region having the second characteristic and/or failing to have the first characteristic. For example, if the second characteristic is a "nothing/null" semantic label, pixels of the second region may not be sent to any content recognition engine. Also, for example, if the second characteristic is a semantic label that is different from a semantic label that is the first characteristic, pixels of the second region may be sent to a content recognition engine—without sending any pixels of the second region to a different content recognition engine to which the first action may be directed.

Figure 8:
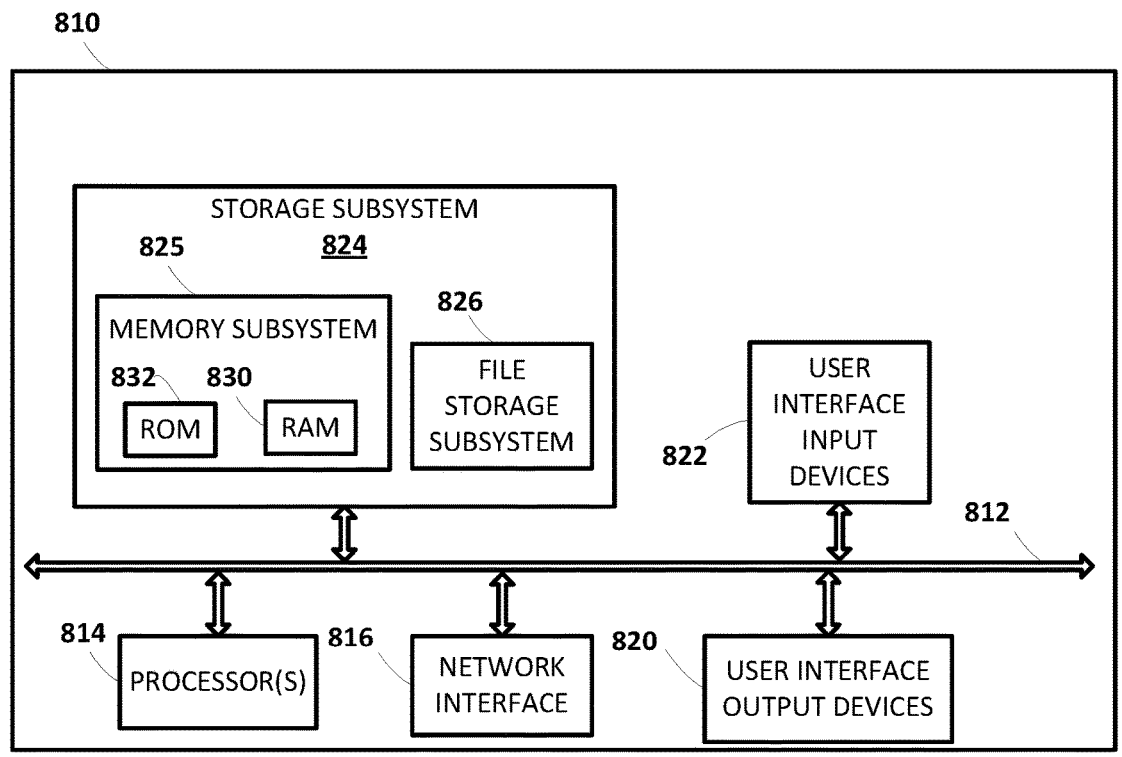
FIG. 8 illustrates an example architecture of a computing device.

FIG. 8 is a block diagram of an example computing device 810 that may optionally be utilized to perform one or more aspects of techniques described herein. In some implementations, computing device 120, interactive content generation system 130, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIGS. 5 and/or 7.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
    capturing, by one or more processors of a computing device, a screenshot image that captures at least a portion of a display provided to a user by the computing device;
    segmenting the screenshot image into at least a first region and a second region, the segmenting being by one or more of the processors of the computing device and being based on a plurality of pixels of the screenshot image;
    determining at least one first characteristic of the first region, the determining being by one or more of the processors of the computing device and being based on one or more of: a plurality of pixels of the first region, a size of the first region, and a position of the first region;
    determining at least one second characteristic of the second region, the determining being by one or more of the processors of the computing device and being based on one or more of: a plurality of pixels of the second region, a size of the second region, and a position of the second region; and providing, by one or more of the processors of the computing device, a plurality of the pixels of the first region to a content recognition engine based on the first region having the first characteristic;

wherein the pixels of the second region are not provided to any content recognition engine based on the second region having the second characteristic, and wherein the first characteristic is a first semantic label and the second characteristic is a second semantic label.

2. The method of claim 1, wherein the pixels of the second region are not provided for any further action based on the second region having the second characteristic.

3. The method of claim 1, further comprising:
receiving, from the content recognition engine in response to providing the plurality of the pixels of the first region, an indication of content of the first region; and
rendering, by one or more of the processors, interactive content at the computing device based on the received indication of content of the first region.

4. The method of claim 1, further comprising:
selecting the content recognition engine, from a plurality of available content recognition engines, based on the first characteristic; and
based on selecting the content recognition engine:
providing the plurality of the pixels of the first region to the selected content recognition engine, without providing any of the pixels of the first region to any other of the available content recognition engines.

5. The method of claim 1, further comprising:
receiving, from the content recognition engine in response to providing the plurality of the pixels of the first region, text that is present in the first region; and
rendering, by one or more of the processors, content at the computing device based on the received text.

6. The method of claim 1, further comprising:
receiving, from the content recognition engine in response to providing the plurality of the pixels of the first region, at least one entity present in the first region; and
rendering, by one or more of the processors, content at the computing device based on the received at least one entity.

7. The method of claim 1, further comprising:
selecting the content recognition engine, from a plurality of available content recognition engines, based on the first characteristic; and
based on selecting the content recognition engine:
providing the plurality of the pixels of the first region to the selected content recognition engine, without providing any of the pixels of the first region to at least one other of the available content recognition engines.

8. The method of claim 1, wherein the content recognition engine comprises a trained machine learning model.

9. The method of claim 1, wherein the content recognition engine comprises a trained convolutional neural network model.

10. A client computing device, comprising:
one or more computer readable media storing instructions;
one or more processors executing the instructions to perform a method comprising:
capturing a screenshot image that captures at least a portion of a display provided to a user by the client computing device;
segmenting, based on a plurality of pixels of the screenshot image, the screenshot image into at least a first region and a second region;
determining at least one first characteristic of the first region, the determining being based on one or more of: a plurality of pixels of the first region, a size of the first region, and a position of the first region;
determining at least one second characteristic of the second region, the determining being based on one or more of: a plurality of pixels of the second region, a size of the second region, and a position of the second region; and
providing a plurality of the pixels of the first region to a content recognition engine based on the first region having the first characteristic;
wherein the pixels of the second region are not provided to any content recognition engine based on the second region having the second characteristic, and wherein the first characteristic is a first semantic label and the second characteristic is a second semantic label.

11. The client computing device of claim 10, wherein the pixels of the second region are not provided for any further action based on the second region having the second characteristic.

12. The client computing device of claim 10, wherein the method further comprises:
receiving, from the content recognition engine in response to providing the plurality of the pixels of the first region, an indication of content of the first region; and
rendering interactive content based on the received indication of content of the first region.

13. The client computing device of claim 10, wherein the method further comprises:
selecting the content recognition engine, from a plurality of available content recognition engines, based on the first characteristic; and
based on selecting the content recognition engine:
providing the plurality of the pixels of the first region to the selected content recognition engine, without providing any of the pixels of the first region to any other of the available content recognition engines.

14. The client computing device of claim 10, wherein the method further comprises:
receiving, from the content recognition engine in response to providing the plurality of the pixels of the first region, text that is present in the first region; and
rendering content based on the received text.

15. The client computing device of claim 10, wherein the method further comprises:
receiving, from the content recognition engine in response to providing the plurality of the pixels of the first region, at least one entity present in the first region; and
rendering content based on the received at least one entity.

16. The client computing device of claim 10, wherein the method further comprises:
selecting the content recognition engine, from a plurality of available content recognition engines, based on the first characteristic; and
based on selecting the content recognition engine:
providing the plurality of the pixels of the first region to the selected content recognition engine, without providing any of the pixels of the first region to at least one other of the available content recognition engines.

17. The client computing device of claim 10, wherein the content recognition engine comprises a trained machine learning model.

18. The client computing device of claim 10, wherein the content recognition engine comprises a trained convolutional neural network model.

* * * * *